United States Patent [19]

Shimizu et al.

[11] Patent Number: 4,826,550

[45] Date of Patent: May 2, 1989

[54] PROCESS FOR PREPARING MOLDED PRODUCT OF THERMOCHROMIC POLYVINYL CHLORIDE

[75] Inventors: Goro Shimizu, Ohtsu; Yoshimi Hayashi, Kyoto; Yosuke Kitagawa, Ohtsu, all of Japan

[73] Assignee: Matui Shikiso Chemical Co., Ltd., Japan

[21] Appl. No.: 933,630

[22] Filed: Nov. 21, 1986

[30] Foreign Application Priority Data

Nov. 28, 1985 [JP] Japan .................... 60-269045

[51] Int. Cl.⁴ .................... C09D 67/08; C09D 69/00
[52] U.S. Cl. .................... 156/166; 106/21; 264/4.32; 264/4.33; 264/137; 264/299; 427/213.3; 427/213.31; 427/145; 427/356; 427/358
[58] Field of Search .............. 252/586; 430/138, 964; 106/22, 288 R, 21; 264/4.1, 4.32, 4.33, 137, 209.1, 241, 299; 427/213.3, 213.31, 421, 428, 356, 358, 145; 156/166

[56] References Cited

U.S. PATENT DOCUMENTS

| | | | |
|---|---|---|---|
| 3,539,375 | 11/1970 | Baum | 430/210 |
| 3,560,229 | 2/1971 | Farnham et al. | 106/21 |
| 3,705,037 | 12/1972 | Inoue et al. | 430/339 |
| 3,741,628 | 6/1973 | Margerum | 350/354 |
| 4,028,118 | 6/1977 | Nakasuji et al. | 106/21 |
| 4,054,684 | 10/1977 | Ceintrey et al. | 106/21 |
| 4,086,054 | 4/1978 | Seibert et al. | 8/938 |
| 4,341,565 | 7/1982 | Martenson | 106/307 |
| 4,421,560 | 12/1983 | Kito et al. | 106/21 |
| 4,425,161 | 1/1984 | Chibahashi et al. | 106/21 |
| 4,501,876 | 2/1985 | Zahi | 528/232 |
| 4,502,066 | 2/1985 | Satake et al. | 427/151 |

FOREIGN PATENT DOCUMENTS

| | | |
|---|---|---|
| 58-32671 | 2/1983 | Japan . |
| 1405701 | 9/1975 | United Kingdom . |
| 2093055 | 8/1982 | United Kingdom . |

*Primary Examiner*—Hubert Lorin
*Attorney, Agent, or Firm*—McGlew & Tuttle

[57] ABSTRACT

A process for preparing a molded product of thermochromic polyvinyl chloride characterized by incorporating a thermochromic particulate material into a vinyl chloride plastisol comprising a vinyl chloride resin, plasticizer, stabilizer, lubricant and filler, and molding the resulting mixture. The thermochromic particulate material is prepared from particles of a non-thermoplastic resin having encapusated therein the three components of electron-donating chromogenic substance, electron-accepting substance and solvent by coating the particles with a hydrophilic high-molecular-weight compound.

9 Claims, 1 Drawing Sheet

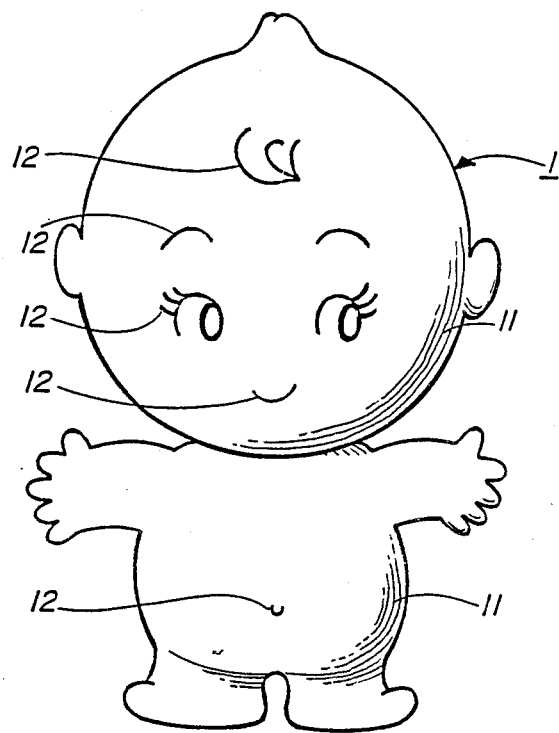

PROCESS FOR PREPARING MOLDED PRODUCT OF THERMOCHROMIC POLYVINYL CHLORIDE

BACKGROUND OF THE INVENTION

1. Field of the Invention

The present invention relates to a process for preparing molded thermochromic polyvinyl chloride products which are highly sensitive to a change of temperature to undergo a reversible color change.

2. Description of the Prior Art

Polyvinyl chloride paste can be processed into a wide variety of products inexpensively by various methods, such as coating, casting, dipping and molding, with use of relatively simple equipment.

However, these products are simply colored with usual dyes or pigments and therefore still remain to be given a higher commercial value.

In recent years, it has become well known to form desired designs, markings or patterns on paper, cloth, leather or the like with various thermochromic materials, especially with an ink having high coloring ability and incorporating the three components of electron-donating chromogenic substance, electron-accepting substance and solvent in mixture so as to give color which reversibly changes with a change of ambient temperature. Attention has been directed to the use of such thermochromic materials for forming thermochromic patterns on articles prepared from polyvinyl chloride paste since the product is expected to have great industrial usefulness.

While the thermochromic material which is a mixture of the foregoing three components exhibits thermochromic properties only when the three components are strictly in a specified ratio, the three-component mixture has drawbacks when admixed with vinyl chloride plastisol. The three components are liable to physically flow out of the system owing to dissolving out or evaporation. The plasticizer, stabilizer, lubricant or the like contained in the paste will penetrate into the system to produce an adverse effect. Such phenomena become more pronounced at elevated temperatures, with the result that the product often fails to exhibit any color change in response to a change of temperature. Accordingly, it has been practically impossible to use thermochromic materials for molded vinyl chloride products.

SUMMARY OF THE INVENTION

The present applicant has already disclosed in Japanese Patent Application No. SHO 56-131753 (Unexamined Patent Publication No. SHO 58-32671) a thermochromic particulate material which is prepared from particles of a non-thermoplastic resin having enclosed therein the three components of electron-donating chromogenic substance, electron-accepting substance and solvent by coating the particles with a hydrophilic high-molecular-weight compound. The present inventors have carried out intensive research in an attempt to effectively apply thermochromic materials to molded articles of polyvinyl chloride and found that the thermochromic particulate material, when incorporated into a vinyl chloride plastisol, remains free of the influence of the plasticizer, stabilizer, lubricant or the like contained in the plastisol and retains very high stability even when heated. Thus, the inventors have completely overcome the problems heretofore encountered in using thermochromic materials for molded polyvinyl chloride products to accomplish the present invention.

The present invention provides a process for preparing a molded product of thermochromic polyvinyl chloride characterized by incorporating a thermochromic particulate material into a vinyl chloride plastisol comprising a vinyl chloride resin, plasticizer, stabilizer, lubricant and filler, and molding the resulting mixture, the thermochromic particulate material being prepared from particles of a non-thermoplastic resin having encapsulated therein the three components of electron-donating chromogenic substance, electron-accepting substance and solvent by coating the particles with a hydrophilic high-molecular-weight compound.

Because of the above feature, the present invention makes it possible to prepare a molded thermochromic polyvinyl chloride product which reliably undergoes a reversible color change with a change of temperature. For example, as described in Example 1 and shown in the drawing, a Kewpie doll 1 having a bright pink color at room temperature of up to about 40° C. becomes skin-colored when the temperature rises beyond about 40° C., and the color change is reversible.

BRIEF DESCRIPTION OF THE DRAWING

The drawing shows an example of thermochromic polyvinyl chloride product prepared by the process of the present invention.

DETAILED DESCRIPTION OF THE INVENTION

Examples of electron-donating chromogenic substances useful for the thermochromic particulate material to be used in the present process are substituted phenylmethanes and fluorans such as 3,3'-dimethoxyfluoran (yellow), 3-chloro-6-phenylaminofluoran (orange), 3-diethylamino-6-methyl-7-chlorofluoran (vermillion), 3-diethyl-7,8-benzofluoran (pink), 3,3',3''-tris(p-dimethylaminophenyl) phthalide (purplish blue), 3,3'-bis-(p-dimethylaminophenyl) phthalide (green) and 3-diethylamino-6-methyl-7-phenylaminofluoran (black), indolyl phthalides, spiropyrans, coumarins, etc. These substances are used singly, or at least two of them are used in admixture.

Examples of electron-accepting substances to be coupled with such electron-donating chromogenic substances for forming colors are phenols such as p-phenylphenol, bisphenol A, cresol, resorcin, phloroglucin, phenolic resin oligomers, β-naphthol, and metal salts and ammonium salts of such phenols; and benzotriazoles such as 5-chlorobenzotriazole, 4-laurylaminosulfobenzotriazole, 5-butylbenzotriazole dibenzotriazole, 2-hydroxybenzotriazole, 5-carboethoxytriazole, and metal salts and ammonium salts of such triazoles. While these substances are used singly or in admixture, especially preferable for the present process are triazoles.

With the process of the present invention, a solvent is used conjointly with the electron-donating chromogenic substance and the corresponding electron-accepting substance. Examples of suitable solvents are those having a boiling point of at least 150° C. at atmospheric pressure and including alcohols such as octyl alcohol, myricyl alcohol and geraniol, esters such as lauryl stearate and palmitic acid glyceride, azomethines such as benzylideneaniline and benzylidenelaurylamine, amides such as acetamide and stearic acid amide, etc. The solvent determines the color change temperature of the thermochromic particulate material.

The foregoing three components are conjointly enclosed in particles of a non-thermoplastic resin, such as polyester resin, polyurethane resin, melamine resin or epoxy resin, serving as a film forming material by a known encapsulating method such as interface polymerization or in situ polymerization. The particles are then suspended in water and coated with a hydrophilic high-molecular-weight compound such as polyvinyl alcohol, polyacrylic acid, gelatin, methylcellulose or alginic acid, whereby a thermochromic particulate material is obtained.

The thermochromic particulate material, which is usable singly or in combination with common dyes or pigments, is uniformly admixed with a vinyl chloride plastisol comprising a vinyl chloride paste resin, plasticizer, stabilizer, filler, etc., and the mixture is molded or applied for coating by one of various methods such as dip molding, dip coating, slush molding, rotational molding, cast molding, roll coating, knife coating and spray coating. In this step, the mixture is heated to about 200° C. for gelation and made into various useful articles.

The vinyl chloride plastisol is prepared from the following materials. For the vinyl chloride paste resin, it is suitable to use solid spherical smooth-surfaced vinyl chloride resin particles up to 10 microns in size. Examples of useful stabilizers are tribasic lead, dibasic lead phosphite and dibasic lead phthalate which are highly soluble in plasticizers, and metal soaps, such as lead stearate and cadmium stearate, which are serviceable also as lubricants. Examples of useful plasticizers are DOP, DOA, DOS and paraffin chloride. Examples of useful lubricants are stearic acid, palmitic acid and like saturated fatty acids, esters thereof, ethers and waxes. Examples of useful fillers are barium sulfate, precipitated calcium carbonate, granulated calcium carbonate, etc.

Without departing from the scope of the present invention, the particulate material or vinyl chloride plastisol may contain usual chemicals such as viscosity adjusting agent, ultraviolet absorber, antioxidant, dye, pigment, fluorescent whitener, fluorescent pigment, surfactant, water repellent, defoaming agent, oil fat, wax, crosslinking agent, catalyst, resin, solvent and the like.

The present invention will be described with reference to the following examples, in which the parts are by weight.

EXAMPLE 1

To a vinyl chloride plastisol comprising 100 parts of Zeon 121 (vinyl chloride resin, product of Nippon Zeon Co., Ltd.), 50 parts of DOP, 50 parts of polyester-type plasticizer, 5 parts of dibasic lead phosphite and 2 parts of zinc stearate were added 2 parts of Chromic Color S-37 Pink (thermochromic particulate material, product of Matsui Shikiso Chemical Co., Ltd.) and 0.2 parts of Glow Gold MFR Powder (fluorescent pigment, product of Matsui Shikiso Chemical Co., Ltd.). The mixture was thoroughly stirred and made into a uniform paste, which was placed into a mold for slush-molding a Kewpie doll. When the paste was heated at 180° C. for 1 to 2 minutes, the paste solidified over a thickness of about 1 mm from the mold surface, forming a solid film. The inner paste portion more than about 1 mm away from the mold surface was still in a liquid state and therefore removed by inverting the mold. The remaining portion was heated again at 200° C. for 2 minutes to obtain a completely molded body, which was removed from the mold after cooling, whereby a Kewpie doll 1 shown in the drawing was obtained as a slush-molded product. At a temperature of up to about 40° C., the doll 1 was bright pink at thermochromic portions 11 other than usual color portions 12, i.e., the hair, brows, eyes, mouth and navel, but when the doll was heated to a temperature beyond about 40° C., the thermochromic portions 11 became skin-colored. The color change occurred reversibly repeatedly.

EXAMPLE 2

To 98 parts of Alphasol K (vinyl chloride plastisol, product of Alpha Kasei Co., Ltd.) were added 2 parts of Chromic Color S-32 Turquoise Blue (thermochromic particulate material, product of Matsui Shikiso Chemical Co., Ltd.) and 0.2 part of Novoperm Yellow H10G (organic pigment, product of Hoechst Japan). The mixture was thoroughly stirred, placed into a mold for producing a ball, heated at 200° C. for 3 minutes for gelation while rotating the mold in every direction biaxially, cooled with water and removed from the mold to obtain a hollow ball. The ball was green at a temperature of up to about 35° C. but turned yellow when heated to a temperature beyond about 35° C. The color change was reversible repeatedly.

EXAMPLE 3

Fifty polyester monofilaments, 10 microns in diameter, were bundled and twisted into a polyester yarn having an outside diameter of 100 microns. The twisted yarn was impregnated with a plastisol comprising 100 parts of Alphasol M (vinyl chloride plastisol, product of Alpha Kasei Co., Ltd.), 5 parts of Chromic Color S-22 Pink (thermochromic particulate material, product of Matsui Shikiso Chemical Co., Ltd.) and 1 part of Glow Yellow MF2G (fluorescent pigment, product of Matsui Shikiso Chemical Co., Ltd.), then passed through a nozzle, 150 microns in diameter, to remove an excess of liquid, and passed through an oven at 180° C. for 2 minutes for melting and gelation to obtain a yarn about 150 microns in outside diameter. The yarn was red at room temperature but turned bright yellow when heated to a temperature beyond 22° C. The color change was repeatedly reversible.

EXAMPLE 4

Fifty polyester monofilaments, 10 microns in diameter, were bundled without twisting and impregnated with a plastisol comprising 100 parts of Alphasol M (vinyl chloride plastisol, product of Alpha Kasei Co., Ltd.), 5 parts of Chromic Color S-22 Pink (thermochromic particulate material, product of Matsui Shikiso Chemical Co., Ltd.), 1 part of Glow Yellow MF2G (fluorescent pigment, product of Matsui Shikiso Chemical Co., Ltd.) and 10 parts of Pegasol R-150 (petroleum solvent, product of Mobil Oil Co.), followed by the same procedure as in Example 3 to obtain a yarn, 150 microns in outside diameter. The yarn exhibited the same thermochromic function as the one obtained in Example 3 and was superior thereto in resistance to abrasion and scratching.

EXAMPLE 5

A cotton fabric serving as a substrate sheet, while being transported on a belt conveyor in a horizontal position, was coated by knife coating with a plastisol comprising 100 parts of Alphasol P (vinyl chloride plastisol, product of Alpha Kasei Co., Ltd.) and 0.5 part of Hostaperm Scarlet HF3S (organic pigment, product of Hoechst Japan) to a thickness of 100 microns and passed through an oven at 200° C. for 2 minutes for melting and gelation to obtain an orange vinyl chloride sheet. The sheet was further knife-coated with a paste comprising 100 parts of Alphasol P (vinyl chloride plastisol, product of Alpha Kasei Co., Ltd.) and 5 parts of Chromic Color Turquoise Blue (thermochromic particulate material, product of Matsui Shikiso Co., Ltd.) to a thickness of 100 microns and heated at 200° C. for 3 minutes to prepare a thermochromic vinyl sheet. The sheet was brilliant blue at a temperature of up to 22° C. but turned orange when the temperature rose beyond about 22° C. The color change was reversible repeatedly.

ADVANTAGES OF THE PRESENT INVENTION

The process of the present invention has the following advantages.

(a) The present process affords molded polyvinyl chloride products having thermochromic properties to undergo a color change unlike conventional products. Furthermore, conventional coloring agents are usable conjointly with the thermochromic material. Thus, the process provides commodities which are remarkably improved in fashionability and function.

(b) The process provides molded products of desired colors and color change temperatures for a wide variety of uses when different electron-donating chromogenic substances, electron-accepting substances and solvents are used in desired combinations.

(c) Since the thermochromic particulate materials are in the form of double capsules, the molded vinyl chloride product obtained has an excellent quality.

It will be appreciated that the final chloride plastisol need not include a filler since such is an optional ingredient, whereas the plasticizer, stabilizer and lubricant are usually required to form and provide a polyvinyl chloride product of favorable properties for generally contemplated purposes.

However, because of their normally adverse effect on the thermochromic particulate material, due to the propensity of such plasticizer, stabilizer and lubricant ingredients otherwise to penetrate through the non-thermoplastic resin encapsulating layer, such as during the heating of the molded mixture to polymerize the plastisol or even thereafter as the thermochromic particles exist in the final molded product with time, the presence of the coating of the hydrophilic high molecular weight compound is essential according to the present invention to overcome this propensity, and the conjoint presence of these two differentially functioning coatings or layers unexpectedly provides the advantages of the instant moldable system despite the otherwise propensity of the vinyl chloride plastisol constituents to migrate through the corresponding molded products.

Thus, on the one hand, the non-thermoplastic resin encapsulating layer serves as a permanent outward penetration protective layer or barrier against penetration or migration of any of the three components of the thermochromic system outwardly therethrough, which migration would adversely affect the proper ratio of the three components to each other and their effective temperature dependent reversible color functioning.

On the other hand, at elevated temperatures as well as at normal ambient temperature the coating of the hydrophilic high molecular weight compound or substance independently serves as a permanent inward penetration protective layer or barrier against penetration or migration of any of the plastisol ingredients inwardly therethrough and in turn through the non-thermoplastic resin layer, which migration would also adversely affect the proper reversible color functioning of such three components.

Both such layers of the resulting double capsule form particles constituting the thermochromic particulate material serve herein as corresponding barriers, not only during the elevated temperature polymerization of the plastisol to produce the molded product, but also thereafter with respect to the particles as they exist in the product, i.e. without degradation with time, whether the product is a hollow shaped product, a coated yarn product, a double layer composite substrate sheet product, or the like as is clear from the above examples.

Significantly, since the plastisol ingredients are generally hydrophobic in nature, whereas the outer layer or coating is formed of a hydrophilic high molecular weight compound or substance, the coating in the same way also serves to resist penetration inwardly therethrough of petroleum solvent and other organic solvents or liquids, and similar organic hydrophobic constituents which might be contained in the plastisol and which could potentially constitute substances that would adversely affect the proper disposition and functioning of the three encapsulated components in the thermochromic particulate material as is also clear from the above examples.

By way of theoretical explanation, it will be appreciated that the thermochromic particulate material is in the form of microcapsules which are actually particles of more or less colloidal size and that the electron donating chromogenic substance (reducing agent) is a thermally color changeable dye, i.e. in its three component system with the electron accepting substance (oxidizing agent) and solvent, and like dyes in general is also of colloid size. Moreover, plastic resins such as liquid plastisols are likewise more or less colloidal in nature.

The non-thermoplastic resin which encapsulates the thermochromic three component system is necessarily in the form of an extremely thin encapsulating wall that will inherently contain minute openings or pores that would otherwise permit passage therethrough of small size colloid, particles or dissolved molecules, atoms or disassociated ions as the case may be. The same minute opening or pore arrangement is true of the outer hydrophilic layer.

It is generally recognized in non-polar molecules the atoms are held together by attractive forces involving exchange energy of electron pair sharing nature and that in polar molecules the atoms are held together by attractive forces involving electrostatic attraction of ionic nature with most linkages between atoms being considered to involve both non-polar electron pair and polar electrostatic forces, such that one predominates over the other. Such electrostatic attraction is generally considered to be of the ion, dipole or induced dipole binding type.

Whereas an ion concerns an atom or group of atoms of definite electric charge resulting from the gain (reduction) or loss (oxidation) of an electron, a dipole concerns a molecule of equal positive and negative charges but located such that one part of the molecule is predominantly positive while a different part is predominantly negative thereby resulting in an electrical imbalance whose effect is quantified in terms of its dipole moment, water being an example of a molecule having a large dipole moment. On the other hand, an induced dipole is considered to occur in a molecule from the proximity of a charged portion of an adjacent molecule (van der Waals' forces). These three types of binding arrangements can theoretically provide six possible positive-negative charge combinations since two atoms and/or molecules are involved, such as ion-ion attraction binding, dipole-dipole attraction binding, ion-dipole attraction binding, ion-induced dipole attraction binding, etc. Clearly, the distance between potentially, mutually attracting non-polar and/or polar units and the dielectric constant of the solvent present influence the formation and breaking of these various binding linkages.

It is known that one or more non-volatile solutes dissolved in a solvent cause the solvent vapor pressure and freezing point to decrease and its boiling point to increase with osmotic pressure also being affected, these four properties being interrelated and constituting colligative properties of solutions which are directly proportional to the solute concentration, i.e. the greater the solute concentration, the greater the vapor pressure lowering. As to osmosis, which concerns the passage of a solvent through a semi-permeable membrane from a more dilute (high-vapor pressure) to a more concentrated (low vapor pressure) solution, the solvent can traverse the membrane but the dissolved solute cannot, yet if pressure is exerted on the more concentrated solution, the passage of the solvent will reverse.

In dialysis, on the other hand, certain solutes are able to diffuse through the membrane while others cannot, based on the difference between their diffusion rates, such being used for instance to separate crystalloids as electrolytes from colloid particles in one solution or liquid by passage through a colloid membrane to another liquid. Also, ultrafiltration is used to force a liquid and solute through fine pores of a filter membrane which holds back the colloid particles, by a mechanism which is considered to involve electric attraction and surface adsorption traceable to the filter itself and not merely mechanical filtration separation.

Dyes are among the smallest colloid particles and often exist as complex salts which disassociate into ions in solution such that the resulting cations which are small can pass through a membrane while the anions which are large cannot, thereby producing an osmotic effect and concomitant change in the other colligative properties, e.g. when the system has an equal number of positive and negative ions that maintain electrical neutrality. In fact, even without a membrane, the interraction of slow and rapidly moving or diffusing charged particles in a colloid system is comparable to the action occurring where the particles and ions are separated by a membrane rather than in terms of a difference in velocities or diffusion rates.

Colloids are recognized as dispersed systems of solid, liquid or gas particles (dispersoids) of about $10^{-7}$ to $10^{-4}$ cm. (or 0.001 to 1 micron or 10 to 10,000 angstroms) in diameter and very high composite surface area distributed as a dispersed phase of either all negatively or all positively electrically charged particles throughout a dispersing medium in the form of a liquid, gas or solid as the case may be. Colloid solutions possess the above noted colligative properties, specifically having low osmotic pressure and freezing point comparable to those of the pure solvent, but are distinguished from true solutions in that they contain small discrete suspended particles whose correspondingly high surface are adsorbs ions and other materials, with the formation of like electric charges on the particles that prevent particle aggregation and settling out. When the dispersing medium exerts an attracting influence on the particles, e.g. where the solvent overcomes the attractive force between the molecules based on dipole-dipole interaction, the colloid is lyophilic, but when there is no such attraction or in fact a repelling effect the colloid is lyophobic.

As in the case of ions, colloidal particles cause a decrease in vapor pressure and freezing point and create an osmotic pressure and the actions of both ions and colloid particles may operate together regarding the collagative properties although colloid particles are held back by an osmotic membrane. Ions tend to become attached or adsorbed to colloid particles inducing an opposite charge on the adjacent molecule and being held to the particle surface by ion induced dipole attraction which exerts a stabalizing effect on the colloid since the common sign resultant charge on the particles tends to repel them from one another and thereby inhibit aggregation and settling out, such effect being dependent on the nature of the particles and ions involved as well as the concentration, pressure, temperature and surface area.

Even so, this effect can be further modified in that the layer of absorbed ions itself tends to attract other ions of opposite charge to form an outer layer such that the colloid particles have a double layer of two oppositely charged ions in the nature of a capacitor electric field, with the electric potential drop through the outer layer to the adjacent film of the surrounding dispersing medium being known as the zeta potential and which decreases as the electrolyte concentration increases in the dispersing medium.

If a high concentration of ions is present the electrolyte effect may cause removal of the double layer, particle aggregation and settling out of large particles formed from a lyophobic colloid, whereas in the case of a lyophilic colloid which is solvated by the surrounding film of the dispersing medium, removal of both the film and the double layer must occur before such aggregation and settling out occur, the formation of deltas at the mouths of fresh water rivers caused by the settling out of muddy colloid particles upon contact with sea water electrolytes being a general example of this action.

Moreover, where a lyophilic colloid is added to a lyophobic colloid solution, it may form a protective coating of opposite electric sign around the lyophobic colloid particles due to the mutual attraction of the two colloids such that the so coated particles act as a lyophilic composite colloid more stable to settling out under the action of ions in the dispersing medium. If the system contains two partially miscible liquids each dissolving to some extent in the other, the resulting interfacial surface tension causes the particles to concentrate in one or both liquids at the interface in a manner having a decisive influence on the integrity of the colloid system.

Some lyophilic colloids are positively charged in acid solution and negatively charged in alkaline solution, acting akin to amphoteric electrolytes which when dissociated can yield either hydrogen or hydroxyl ions. The colloid system isoelectric point is reached at that ion concentration at which the particles have no net charge and a zero zeta potential and are at minimum stability, viscosity and electrical conductivity.

As to the instant three component containing thermochromic microcapsules, it is believed that the interaction between the electron donating chromogenic substance which is normally a solid, and the electron accepting substance which may be either a solid or a liquid, is influenced by their individual or conjoint degree of solubility in the solvent which may also be normally a solid or a liquid, with changing temperature, and by changes in the colligative properties of the system which occur in relation thereto and in particular changes in the inherent colloid system present in terms of changes in electrical potential and electric sign, diffusion rates, solution concentration and dielectric constant as regards non-polar and polar solvent and solute constitutents and ionic dissociation rates, interfacial tension, pressure, etc.

Since the inner layer microcapsule wall will inherently contain minute openings or pores, and the hydrophilic outer layer thereon will similarly contain such openings or pores, the above considerations will be further influenced by changes in the vapor pressure of the system, such as where the solvent component has a boiling point of about 150° C. and the microcapsules are heated as a dispersion in the vinyl chloride plastisol at that or a higher temperature, whereby the inner microcapsule wall and outer hydrophilic layer will each act as an osmosis, dialysis or ultra filtration membrane as the case may be.

Thus, the plastisol constitutes an external colloid system of a polymerizable vinyl chloride resin colloidal solution containing plasticizer, stabilizer, lubricant, and optionally filler, substances, the latter per se contemplating the usual permanent color dye or pigment type particles, some or all of which such substances may comprise colloidal particles and/or ionizable solute electrolytes and/or colloidal electrolytes. On the other hand, the double layer microcapsules constitute colloidal particles added to the plastisol external colloid system but with the individual microcapsules made up of differential outer hydrophilic layer and inner non-thermoplastic layer microporous membranes and containing therewithin an internal colloid system in which at least the chromogenic substance is of colloidal size.

While the present invention is not to be limited in terms of the foregoing theoretical explanation, it is completely unexpected that despite the numerous influencing factors enumerated, especially as regards colloid systems, no detrimental effects appear to occur either to the plastisol external colloid system or to the microcapsule thermochromic three component internal colloid system, consequent the combining of the materials, or the subsequent heating and molding thereof to a thermochromic, polyvinyl chloride molded product, and the product obtained possesses not only the desired properties of a polyvinyl chloride product and which are not adversely changed by the presence of the microcapsules but also those of the starting thermochromic particulate material and which are not adversely changed, even with the passage of time, by the association thereof with the other constituents in the resultant molded polyvinyl chloride matrix.

The various features of novelty which characterize the invention are pointed out with particularity in the claims and annexed to and forming a part of this disclosure. For a better understanding of the invention, its operating advantages and specific objects attained by its uses, reference made to the accompanying drawing and descriptive matter in which preferred embodiments of the invention are illustrated.

While specific embodiments of the invention have been described in detail to illustrate the application of the principles of the invention, it will be understood that the invention may be embodied other-wise from departing without such principles.

What is claimed is:

1. Process for preparing a molded product comprising thermochromic polyvinyl chloride, which comprises incorporating a thermochromic particulate material into a vinyl chloride plastisol comprising a vinyl chloride resin, plasticizer, stabilizer and lubricant and molding and heating the resulting mixture to form the product, the thermochromic particulate material being prepared from particles of a non-thermoplastic resin having encapsulated therein the three components of electron donating chromogenic substance, electron accepting substance and solvent, said three components comprising a thermally color changeable reversible color system, by coating the particles with a hydrophilic high-molecular weight compound which is resistant to penetration of the plasticizer, stabilizer and lubricant therethrough into the particles and thereby providing the particles as corresponding double capsules having a hydrophilic high-molecular weight compound outer encapsulating and inward penetration protective layer and a non-thermoplastic resin inner encapsulating and outward penetration protective layer.

2. Process of claim 1, wherein the plastisol also includes a petroleum solvent and the hydrophilic high-molecular weight compound is also resistant to penetration of the petroleum solvent therethrough into the particles.

3. Process of claim 1, wherein the hydrophilic high-molecular weight compound is selected from the group consisting of polyvinyl alcohol, polyacrylic acid, gelatin, methylcellulose and alginic acid, the non-thermoplastic resin is resistant to organic solvents, water and heat, the solvent is substantially water insoluble and has a boiling point of at least 150° C. at atmospheric pressure, and the particles are resistant to rupture when exposed to increased pressure.

4. Process of claim 1, wherein the molding is carried out in a mold to form a hollow shaped product.

5. Process of claim 2 wherein said molding comprises applying said mixture to a yarn by impregnation to form a coating thereon and passing the impregnated yarn through a molding nozzle and heating to form a coated yarn product.

6. Process of claim 5, wherein the yarn is a polyester filament yarn.

7. Process of claim 1 wherein said molding comprises applying said mixture by a molding element as an outer layer onto a vinyl chloride polymer base layer disposed on a substrate sheet, and heating the outer layer to form a double layer containing substrate sheet product.

8. Process of claim 7, wherein the base layer contains a coloring substance of a different color from that of the thermochromic particulate material in the outer layer.

9. Process of claim 1, wherein said vinyl chloride plastisol further comprises a filler.

* * * * *